United States Patent [19]
Lichtenstein et al.

[11] Patent Number: 6,077,311
[45] Date of Patent: Jun. 20, 2000

[54] METHOD AND APPARATUS FOR EXTRACTION OF PROGRAM REGION

[75] Inventors: Walter D. Lichtenstein, Belmont, Mass.; Rune Dahl; Ross Towle, both of San Francisco, Calif.

[73] Assignee: Silicon Graphics, Inc., Mt. View, Calif.

[21] Appl. No.: 08/890,153

[22] Filed: Jul. 9, 1997

[51] Int. Cl.[7] .................................................... G06F 9/45
[52] U.S. Cl. ................................................................ 717/4
[58] Field of Search ................................. 395/704; 717/4

[56] References Cited

U.S. PATENT DOCUMENTS

| | | | |
|---|---|---|---|
| 5,265,254 | 11/1993 | Blasciak et al. | 395/704 |
| 5,408,667 | 4/1995 | Brodie et al. | 395/702 |
| 5,450,586 | 9/1995 | Kuzara et al. | 395/704 |
| 5,907,710 | 5/1999 | Furukawa et al. | 395/708 |

OTHER PUBLICATIONS

Tolujev, Assessment of Simulation Models Based on Trace-file Analysis: A Metamodeling Approach. ACM. pp. 443–450, 1998.

Mike Johnson, *Superscalar Microprocessor Design*, pp. 32–35, Prentice Hall publishing, 1991 ISBN 0–13–875634–1.

*Primary Examiner*—Tariq R. Hafiz
*Assistant Examiner*—Wei Zhen
*Attorney, Agent, or Firm*—Townsend and Townsend and Crew LLP

[57] ABSTRACT

A method and apparatus for marking a region of source code within a program unit and extracting an executable version of this marked region of code. The executable version has a initialized program state equivalent to that of the original source code when the original source code entered the region. The method and apparatus remove as much source code as possible from the original source code while retaining enough code to enable the extracted region execute (replay) in a manner identical to the execution of the program region in the context of the original system.

14 Claims, 4 Drawing Sheets

METHOD AND APPARATUS FOR EXTRACTION OF PROGRAM REGION

BACKGROUND OF THE INVENTION

This application relates in general to software development and debugging. In particular, the invention relates to the testing of source code and extraction of benchmark kernels.

With the advances of microprocessor speed, external disk size and internal memory size, workstations and personal computers are ever more capable of executing ever more intelligent programs at speeds acceptable to the user. Among the costs of the increased intelligence, however, are increased source code size and complexity as well as the concomitant increased development time.

Part of the development time for complex programs is the repeated execution of large amounts of code to set up the conditions to be tested. While a single or few executions of a large program are unremarkable, the numerous executions of a large program for test and debugging purposes are a significant part of the development budget for the program.

Accordingly, there is a need for a suite of development tools that can decrease the development time for large, complex software programs.

A particular example of this is a software developer, who while working on a large system discovers that a small region of code is responsible for a substantial amount of the run time of the large system.

There is a need for development tools that allow the developer to extract the small region for tuning purposes. It is important that the aspects of the environment responsible for the extended execution time be preserved in the extracted region to be tuned. Performance of the extracted region should be a good predictor of the performance of the replaced region in the large system.

Another issue concerns the development of compilers and interpreters for programming languages, which are tested and debugged using program kernels of interest. These program kernels are often extracted by means of a time-consuming process of manually extracting the region of interest form the rest of the program.

There is a need for tools that can help automate the extraction of such kernels.

Also, suppose a software developer working on a large system encounters a problem with base system software, for example, the compiler or run-time libraries. If the developer localizes the problem, he may want to report the problem to the base system developers without giving the base system developers access to the entirety of his own large system.

There are at least two reasons for this. First, the developer may not want to give the base system developers access to proprietary information within the large system. Second, the base system developers usually will have an easier time resolving the problem if they can work with a small, self-contained test case rather than the entirety of the large system.

According there is a need for an software program suite that extracts program regions and their environments close enough to that of the region in situ that problems from the original region in situ are captured in the extracted environment.

These and other goals of the invention will be readily apparent to one of ordinary skill in the art on the reading of the background above and the description below.

SUMMARY OF THE INVENTION

Herein is disclosed a method and apparatus for extracting an executable version of a marked region of code within a program unit. The executable version has a initialized program state equivalent to that of the original source code when the original source code entered the region. The method and apparatus remove as much source code as possible from the original source code while retaining enough code to enable the extracted region to execute (replay) in a manner identical to the execution of the program region in the context of the original system.

In one embodiment, the invention is an apparatus and method that marks the program region in original source and produces an extracted source to execute substantially only the program region as it executes in the original source. In a preferred embodiment, the marking includes conditionally marking the program region in the original source. In another preferred embodiment, before the first step of producing is performed, the invention generates a values-trace file corresponding to the program region and generates an intermediate source corresponding to the original source. The step of producing includes merging the intermediate source and the values-trace file.

DESCRIPTION OF THE PREFERRED EMBODIMENT

Figure 1:
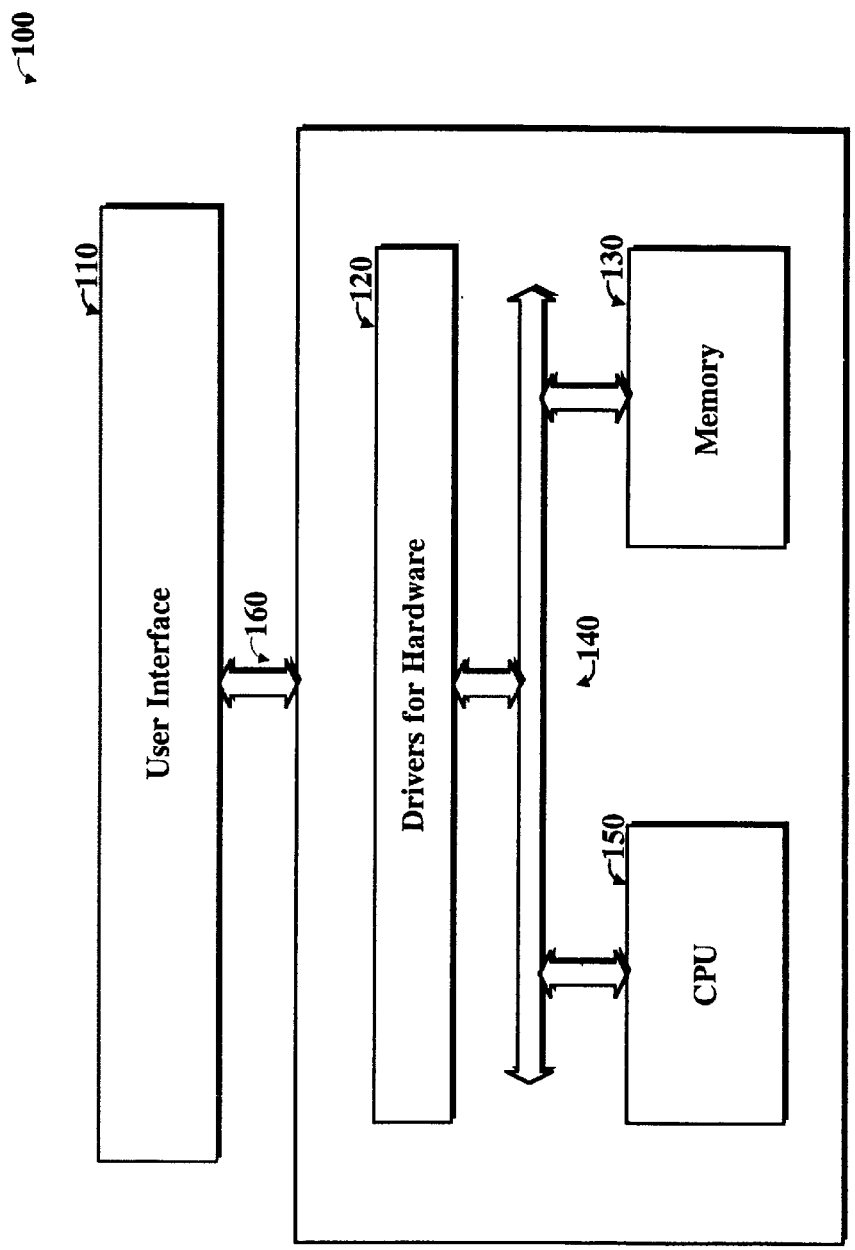
FIG. 1 is a schematic of a computer system according to the prior art and used in an embodiment of the invention.

FIG. 1 is a schematic of a computer system 100 according to the prior art and used in an embodiment of the invention. FIG. 1 includes a subsystem having a CPU 150, a memory 130 and drivers 120 coupled by means of bus 140. A user interface 110 is coupled by means 160 well-known in the art to the subsystem. The user interface typically includes a keyboard and a monitor.

Overview Scenario

Assume that there is some problem with the code of the program of Program-Text Example No. 1 below and that the most likely locus of that bug is in the function f() or in the way function g() calls function f() when n has a value greater than 2. The corresponding desire then is to test the execution of function g() calling function f() (when n is larger than 2 to determine whether any anomaly occurs.

```
00001       INTEGER*4 FUNCTION f(a, b, n)
00002       IMPLICIT NONE
00003       INTEGER*4 n, i
00004       REAL*8 a(n, 2, *)
00005       REAL*8 b(n)
00006       REAL*8 c(n)
00007       DO i=2, n
00008           c(i) = b(i)
00009           a(i, 1, 2)=a(i-1, 1, 2) + c(i)
00010           a(i, 1, 4)=a(i-1, 1, 4) + c(i)
00011       END DO
00012       f=i
00013       END!f
05000       INTEGER*4 FUNCTION g(a, b, n)
05001       IMPLICIT NONE
05002       INTEGER*4 n, f
```

```
05003            REAL*8 a(n, 2,*)
05004            REAL*8 b(n)
  .                .
  .                .
  .                .
m-1              g = f(a, b, n)
m                END!g
60000            PROGRAM ex
60001            IMPLICIT NONE
60002            INTEGER*4 i, g
60003            REAL*8 a(17, 2, 8)
60004            REAL*8 b(17)
60005            a(1, 2) = 8.7
60006            a(1, 4) = 10.7
60007            DO i = 1, 17
60008                 b(i) = 1.0
60009            END DO
  .                .
  .                .
  .                .
n-3              print*, g(a, b, 2)
n-2              print*, g(a, b, 4)
n-1              print*, g(a, b, 8)
n                END!program
```

Program-Text Example No. 1

However, to test function go calling function f() in the program above, the arbitrarily long code sequences from lines 05004 through m-1 in function go and the arbitrarily long code sequence from lines 6005 through n-1 in program ex must each be called. Where the calling of function f() is to be tested repeatedly, these multiple, arbitrarily long code sequences may force a significant delay between iterative executions and consume significant resources.

Accordingly, to avoid the delay, the invention marks the source code of interest, i.e., the function go calling the function f() as illustrated at lines m-1.8, m-1.4 and m-0.5 in the following Program-Text Example No. 2:

```
05000            INTEGER*4 FUNCTION g(a, b, n)
05001            IMPLICIT NONE
05002            INTEGER*4 n, f
05003            REAL*8 a(n, 2,*)
05004            REAL*8 b(n)
  .                .
  .                .
  .                .
m-1.8 C*$*           REGION BEGIN
m-1.4 C*$*           PURPLE CONDITIONAL(n .GT. 2)
m-1              g = f(a, b, n)
m-0.5 C*$*           REGION END
m                END!g
```

Program-Text Example No. 2

After processing as described hereinbelow, the original program code of Program-Text Example No. 1 becomes the extracted source code illustrated in the following Program-Text Example No. 3:

```
00001            INTEGER*4 FUNCTION f(a, b, n)
00002            IMPLICIT NONE
00004'           REAL*8 a(n, 2_8, *)
00005            REAL*8 b(n)
00003'           INTEGER*4 n
00003"           INTEGER*4 i
00006'           REAL*8 deref_c0(n)
00006.1          POINTER(c0, deref_c0)
00006.3          INTEGER*4 preg
00006.6          c0 = ALLOC((n * 8))
00006.9          preg = n
00007'           DO i = 2, preg, 1
00008'                deref_c0(i) = b(i)
00009'                a(i, 1, 2) = (deref_c0(i) + a(i + −1, 1,
00009"       1 2))
00010'                a(i, 1, 4) = (deref_c0(i) + a(i + −1, 1,
00010"       1 4))
00011            END DO
00012            f = i
00012.5          RETURN
00013            END ! f
02000            INTEGER*4 FUNCTION prp_region(a, b, n)
02001            IMPLICIT NONE
02002            REAL*8 a(n, 2_8, *)
02003            REAL*8 b(n)
02004            INTEGER*4 n
02005            INTEGER*4 f
02006            INTEGER*4 preg
02007        C   ****Purple Declarations****
02008        C
02009            INTEGER*8 prp_loc
02010            COMMON /prp_loc/ prp_loc(16)
02011            LOGICAL prp_inited
02012            SAVE prp_inited
02013            DATA prp_inited /.FALSE./
02014        C   ****Purple Initialization****
02015        C
02016            IF (.NOT. prp_inited) THEN
02017                 prp_inited = .TRUE.
02018            END IF
02019            preg = f(a, b, n)
02020            prp_region = preg
02021        C   ****Purple Final Testing****
02022        C
02023            prp_loc(1) = %loc(prp_region)
02024            CALL prp_final_test0(prp_loc(1))
02025            END ! prp_region
60000'           PROGRAM MAIN
60001            IMPLICIT NONE
60003'           REAL*8 a(4, 2, 4)
60004'           REAL*8 b(4)
61000            INTEGER*4 n
61001            EXTERNAL prp_region
61002            INTEGER*4 prp_region
61003            INTEGER*4 prp_return
61004        C   ****Purple Declarations****
61005        C
61006            INTEGER*4 prp_loc
61007            COMMON /prp_loc/ prp_loc(16)
61008            LOGICAL prp_inited
61009            SAVE prp_inited
61010            DATA prp_inited/ .FALSE. /
61011        C   ****Initialization****
61012        C
61013            IF (.NOT. prp_inited) THEN
61014                 prp_inited = .TRUE.
61015                 prp_loc(1) = %loc(n)
61016                 prp_loc(2) = %loc(a)
61017                 prp_loc(4) = %loc(b)
61018                 CALL prp_init0(prp_loc(1),
61018'       1 prp_loc(2) + 64,prp_loc(2) + 192,
61018"       2 prp_loc(4) + 8)
61019            END IF
61020        C
61021        C   ****Call to extracted purple region****
61022        C
61023            prp_return = prp_region(a, b, n)
61024        C   ****Purple Final Testing****
61025        C
61026            prp_loc(1) = %loc(a)
61027            CALL prp_final_test1(prp_loc(1) + 72,
61028        1 prp_loc(1) + 200)
n                END! MAIN
```

Program-Text Example No. 3

(While the code for the function f() in the Program-Text Example No. 3 is semantically identical to that in Program-Text Example No. 1, in a preferred embodiment, the code is textually identical as well. Also, the code at lines 2006 and 2011–2018 are not necessary in this example. Finally, the code at lines 2019 to 2020 can ideally be simplified to "prp_region=f(a, b, n).")

Data Structures

The data structures and protocols to produce extracted source code, according to one embodiment of the invention, are described in this section and in other sections below.

Source Files

The first data structure that the invention uses is a program source code file. (In examples herein, a source code file is designated with a ".f" suffix. In this embodiment, ".f" indicates a FORTRAN program source code file. Equally likely, for example, ".c" could represent source code files, indicating a C program source code file.) The structure of a program source code file, language-dependent and well-known to routine practioners of the programming art of that language, is not further described herein.

Original source code files 310 are examples of source files.

Executable Files

Another data structure the invention uses is an executable file. (In examples herein, an executable file is designated with a ".out" suffix. In this embodiment, ".out" indicates an executable program file on a Unix® or Unix®-like platform. Equally likely, for example, ".exe" could represent executable program files, indicating an executable program file on a Windows® platform.) The structure of an executable file, platform-dependent and well-known to routine practioners of the compilation art for that platform, is not further described herein.

The call_graph_instrumented.out and values_trace_instrumented.out files 330 and 360 are examples of executable files.

Call-Graph Files

A third data structure used by the invention is a call graph. Dynamic and static call graphs are well-known in the compilation art. See, for example, Aho et al., *Compilers: Principles, Techniques and Tools* (Addision-Wesley 1985). As the structure of call graphs is well-known to routine practioners of the compilation art, it is not further described herein. (Aho et al. is incorporated herein by reference.)

The call-graph file 350 is an example of a call-graph file.

Intermediate Source File

Yet another data structure the invention uses is an intermediate source file. An intermediate source file has a structure substantially the same as that of a source code file (described above) except that certain pieces of program text are missing and replaced by placeholders (described below). Intermediate source files are typically not compilable without further processing. In examples herein, intermediate source files are designated with the ".flist" suffix.

Files 370 are examples of intermediate source files.

Trace File

Another data structure used by the invention is a trace file. Trace files record a sequence of events that occurred during a program's execution and are well-known in the compilation art. As the structure of trace files is well-known to routine practioners of the compilation art, it is not further describe herein.

The values-trace file 390 is an example of a trace file.

State Variable

To maintain state while generating a trace file, the invention employs a boolean variable (local to the purple run-time library). The boolean variable indicates whether execution has progressed into a marked region of interest (sometimes referred to herein as a "purple region.")

Until a marked region ("purple region") is entered, as indicated by the boolean state variable, each subroutine in the run-time library supporting the invention suite is nullified or the call to the subroutine is ignored.

Another state variable present in the extracted source files (herein termed "prp_inited" in examples) ensures that initialization only occurs once per program unit. All initialization and final testing is done in terms of user-defined variables. (An array of locations is used to circumvent a constraint in some f77 compilers that prevents the direct passing of a location to a function.)

Circular FIFO

The invention also maintains a small circular first-in/first-out ("FIFO") buffer. Each item in the buffer contains the address and size of a recent mod/ref trace item (described below) written to file. This buffer is (sequentially) searched for every mod/ref trace action. The goal is to reduce the number of trace items issued for the same object. Because, however, a limited-size circular FIFO implementation does not help remove duplicates with more distant proximity, a hash-table may improve effectiveness and efficiency.

Region-Entry Counter

The invention maintains a region-entry counter. This counter helps keep tracing accurate in the presence of recursive calls to a function or subroutine. The counter is initially set to zero. Every time a region-entry event occurs when tracing is already active, the region-entry counter is incremented. Likewise, a region-exit event causes the counter to be decremented.

Protocols

The protocols to effect this region extraction, according to one embodiment of the invention, are described below.

Figure 2:
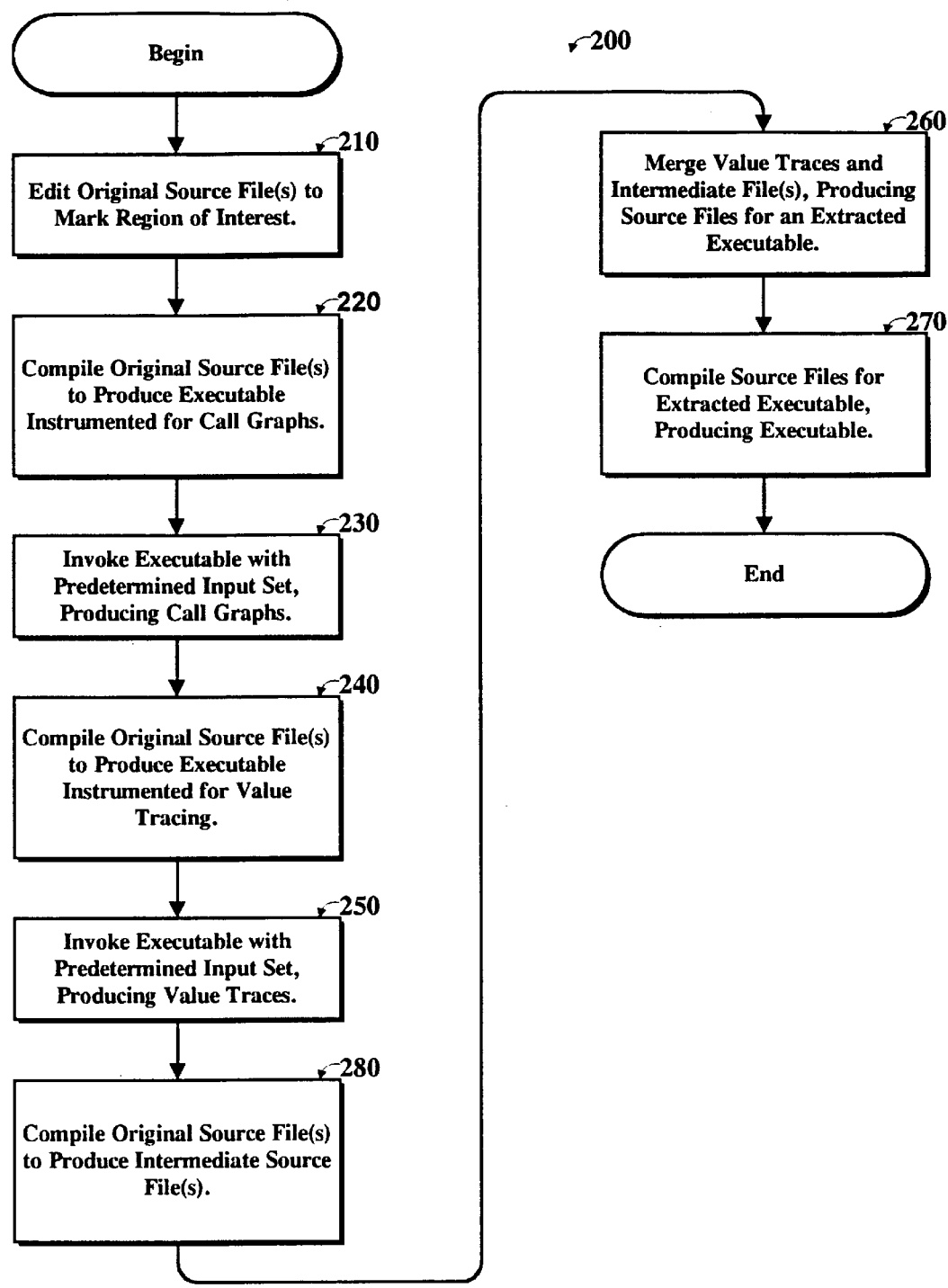
FIG. 2 is a flowchart of the overall location and extraction process.
Figure 3:
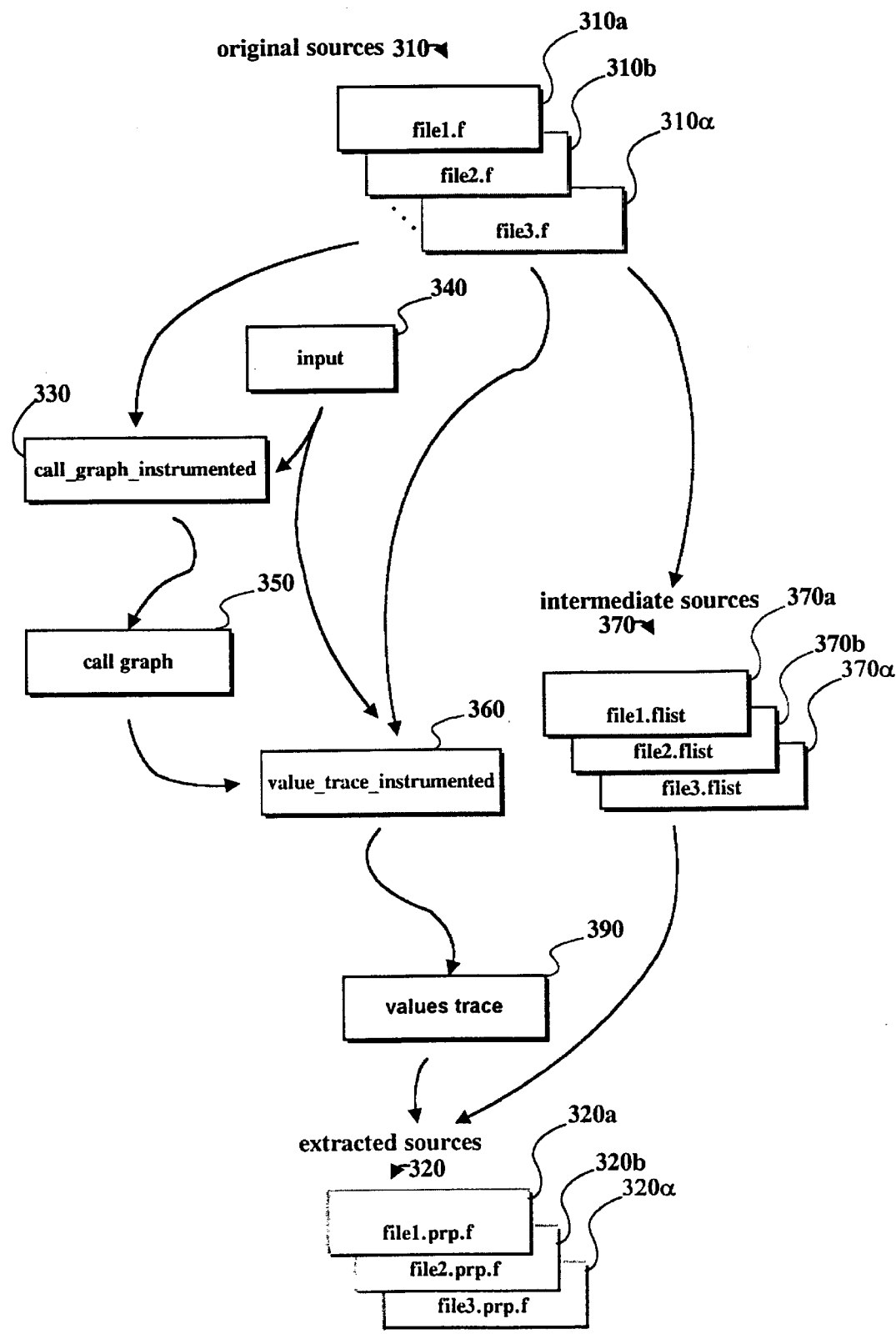
FIG. 3 is a data-flow diagram of the overall location and extraction process.

FIG. 2 is a flowchart of the overall extraction process. FIG. 3 is a data-flow diagram of the overall extraction process. Given a software system consisting of a set of original sources ("OS's") 310, the region extraction process 200 produces a corresponding set of extracted sources ("ES,'s") 320 by first editing the appropriate source file to mark the region of interest, step 210. Then the process 200 compiles all of the OS's 310 to produce an instrumented executable 330, step 220. The process 200 next invokes the executable 330 using an appropriate input set 340, step 230. This produces an output file 350 that holds a record of both the dynamic and static call graphs as they expand from the marked region.

The process 200 compiles all original sources to produce an intermediate source file 370α for every original source file 310α in the OS's 310, step 280.

The compilation also produces a second instrumented executable 360, step 240. The process invokes the second executable 360 using an appropriate input set 380, thus producing an output file 390 tracing values accessed and modified during the execution of the marked region, step 250. Finally, the process produces a final set of sources (the ES's) 320, merging the trace output file 390 with the intermediate source files 370 to produce a corresponding set of extracted source files 320, step 260. The extracted source files 320 can be compiled to produce an extracted executable program (not shown), step 270.

In one embodiment, steps 230 and 250 execute the instrumented system only up until the end of the marked program region and then terminate (e.g., with an EXIT(0)). Any clean-up code normally executed after this is, in fact, not executed.

In one embodiment, the steps 240 and 280 are carried out simultaneously with a single compilation.

Marking the Region of Interest

Each of the steps of the overall process 200 is described in detail below.

Figure 4A:
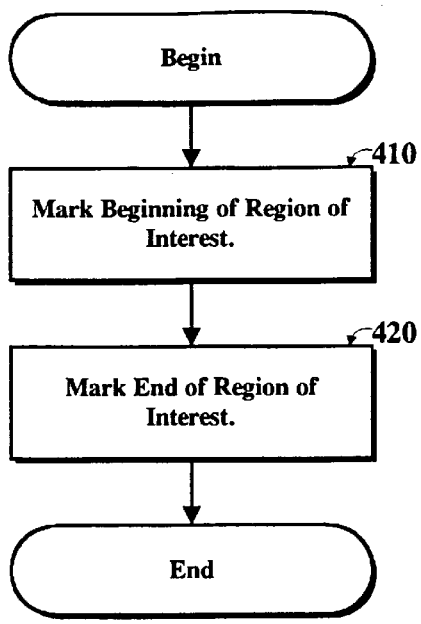
FIGS. 4A and 4B illustrate the editing of a source file to mark the region of interest.
Figure 4B:
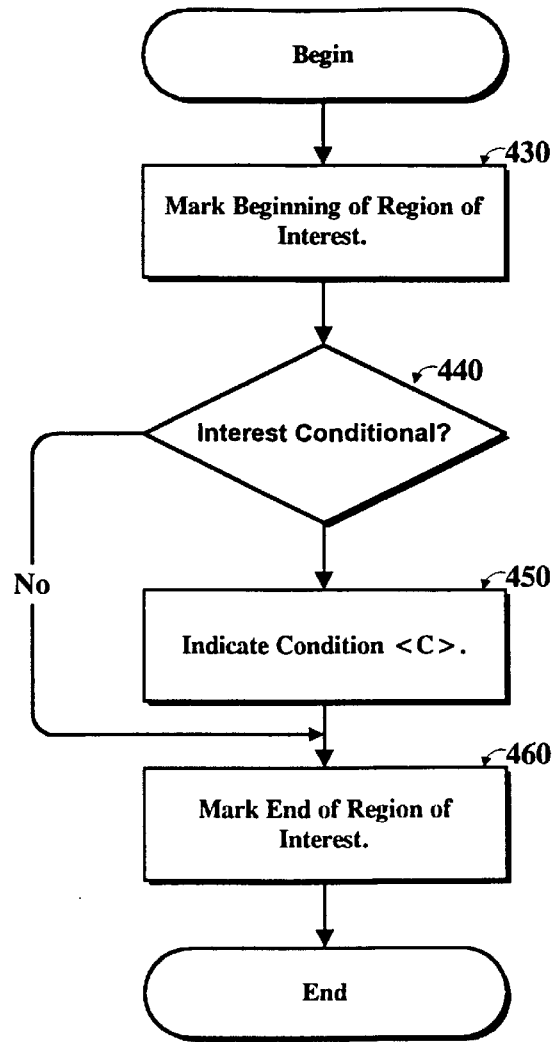

FIGS. 4A and 4B illustrate the editing of a source file to mark the region of interest. Marking the region of interest in a file involves the developer (or debugger) inserting pragmas into the source file of interest to designate the beginning and end of the region of interest. In a first embodiment of FIG. 4A, the pragma unconditionally marks the region for extraction. In another embodiment of FIG. 4B, two alternatives are available for marking: conditional and unconditional.

A pragma unconditionally marking a region according to the first of the above embodiments, steps 410 and 420, can be as follows (steps 410–420):

```
C*$*         REGION BEGIN
             .
             .
             .
             <FORTRAN statements inside marked region>
             .
             .
             .
C*$*         REGION END
```

Program-Text Example No. 4

An example of a pragma unconditionally marking a region according to the second of the above embodiments follows (steps 430 through 460):

```
C*$*         REGION BEGIN
C*$*         PURPLE UNCONDITIONAL
             .
             .
             .
             <FORTRAN statements inside region>
             .
             .
             .
C*$*         REGION END
```

Program-Text Example No. 5

Each of the Program-Text Example Nos. 4 and 5 indicates to the compiler that the developer desires to extract a minimal program that replays the region exactly as it executed in the original program. The above examples define unconditional purple regions that replay the very first execution of the FORTRAN statements inside the marked region.

Alternatively, the developer can specify an interest in reproducing a replay of the marked region only on satisfaction of a constraint <C>. An example of a pragma conditionally marking a region according to this embodiment follows:

```
C*$*         REGION BEGIN
C*$*         PURPLE CONDITIONAL (<C>)
             .
             .
             .
             <FORTRAN statements inside region>
             .
             .
             .
C*$*         REGION END
```

Program-Text Example No. 6

The constraint <C> is a boolean (e.g., LOGICAL*4) expression. This pragma directs the invention suite to extract a program that replays the first instance of execution of the region statements where the given constraint was satisfied. The constraint <C> may refer to any variables visible in the scope of the region statements. Where the constraint <C> is never satisfied, . . .

Program-Text Example No. 2 illustrates a conditional marking of a region of interest. At line m-1.4, the condition to be satisfied is n greater than 2.

Compiling to Produce an Instrumented Executable

Once the region of interest has been marked in the source code files 310, step 210, the developer compiles the source code 310 to produce an executable 330 instrumented to trace call graphs, step 220.

The call-graph instrumentation process inserts calls to the utilities of a run-time library (herein termed "libpurple_runtime.so") to trace call, entry and exit events for every function. The process similarly inserts calls to trace entry and exit events for a marked region.

The instrumentation determines which program units ("PU") the executable 330 called, entered and exited during execution of the marked region. This call-graph instrumentation determines the program units, library functions, and intrinsics the source code references in the scopes entered during that execution, i.e., the dynamic call graph. Additionally, the instrumentation compilation process inserts appropriate instrumentation at the beginning of each marked region and at the beginning of each program unit body to reflect functions references in the OS's but not necessarily references at run time. The results of this instrumentation constitute the static call graph 350, i.e, a list of the program units, library functions, and intrinsics that the extracted source code will reference.

The static and dynamic call graphs are rooted at the selected region and as such do not contain any program units, library function or intrinsics that are irrelevant to the extracted sources. many references before entering the region are not on the call graphs, and the static call graph does not account for references within functions that are not actually called at run time. Subroutines and functions from the original sources 310 in the dynamic call graph 350 are eventually fully defined in the extracted sources 320.

The program units (excluding library functions and intrinsics) in the static call graph 350 that are not also in the dynamic call graph 350 denote functions or subroutines that will never be called but must have a definition. The invention suite emits dummy definitions for such functions and subroutines in the extracted sources 320. (A "dummy definition" is an appropriately named function or subroutine with an empty statement list.)

Also of note, the invention suite calculates the static call graph 350 dynamically, at the same time it determines the dynamic call graph 350. An alternative method calculates the static call graph 350 at compilation time, after determining the dynamic call graph 350, hence the name "static."

In one embodiment, the invention suites combines the static and dynamic call graphs 350 into one call graph 350. There is, at most, one node for each function or subroutine, and any subroutine or function that was entered is marked as such.

The instrumentation of exit events in general, exit events of a double nature and the entry event for the marked region is noteworthy. Each is taken up in turn below.

There can be various kinds of exit points (e.g., for FORTRAN, for intrinsics, RETURN's, GOTO's, TRUEBR's, FALSEBR's). The process inserts an exit event immediately before every exit point, including the conditional exit events (e.g. a TRUEBR).

Implementing the instrumentation at a low (e.g., compiler intermediate language) level rather than a higher (e.g., source-code) level generates a point of complexity with exit points. The instrumentation does not occur between a store into a return register and a subsequent RETURN statement. The instrumented code is itself a subroutine call and may modify the return register. (Implementation at a low level allows the reuse of the implementation across different high-level source languages.)

Where the extraction process may instrument an exit point as both an exit from the marked region and as an exit from a subroutine, the region-exit event takes precedence over a function-exit event. The region-exit point terminates program execution such that the instrumented executable does not reach the function-exit point. The instrumented executable does not exit a function enclosing an active region, other than for recursive calls to the function.

The instrumentation process treats the entry point of the marked region differently from other trace events. Entry into a marked region, either unconditionally or on the satisfaction of the region's constraint, activates tracing. The other tracing events (such as function entry or exit) have no effect until tracing is active. The boolean state variable described above ("prp__inited") maintains the state of tracing.

Call-Graph Generation

The developer executes the instrumented executable 330 to produce the call-graph trace 350. Example command lines for the compilation and execution are shown in Command-Line Example No. 1 following:

$ f77 file1.f file2-f -PURPLE:=on:lang_f77: trace_
        calls/-lpurple_runtime -o call_graph_
        instrumented.out
    $
    $ call_graph_instrumented.out<input>call_graphs
Command-Line Example No. 1

Appendix A contains the "man pages" (reference manual pages) according to one embodiment of the invention. Appendix A is incorporated herein by reference.

Compiling to Produce an Instrumented Executable

Likewise, the developer compiles the source code 310 to produce an executable 360 instrumented to trace value modifications and references (herein "mod/ref"), step 240. The invention suite traces value loads and stores using calls to the run-time library routines ("libpurple_runtime.so") where the arguments are symbolic information, a value base address, value size (in number of bytes), and an enumerated value kind.

Implementing the instrumentation at a low (e.g., compiler intermediate language) level rather than a higher (e.g., source-code) level generates a point of complexity regarding pseudo-registers. A pseudo-register ("pseudo-reg," "preg") has no address, and the instrumentation scheme described above is not useful to denote pseudo-register load and store events. For pseudo-register events, the invention suites traces the values using other events occurring before the load or store events. These events are herein termed "register-value events" or "rvalue events." Besides pseudo-reg loads and stores, such rvalue events are also used to trace bounds of adjustable sized arrays.

Each register-value events is assigned a unique identifier, allowing subsequent events to refer to them. The runtime library ("libpurple_runtime.so") maintains a circular FIFO buffer to hold such values until they are needed by subsequent pseudo-register load and stores. The size of the circular FIFO buffer is large enough to ensure that a later register-value event does not overwrite an earlier register-value event until the earlier register-value event is no longer needed by any subsequent event.

Accordingly, a function herein termed "prp$xsym_load$ ()" traces loads from a symbol. The first argument to the function is the address of the value read in the event. The next arguments are an address offset and a rvalue kind, respectively.

Likewise, a function herein termed "prp$xsym_store$()" traces stores to a symbol. The first argument is the address of the value written in the event. The next arguments are an address offset and a rvalue kind, respectively.

A function herein termed "prp$i4rvalue$()" traces rvalue events. The first argument is the unique identifying number for the rvalue of the event. The second argument is the value itself.

A function herein termed "prp$preg_load()" traces loads of a pseudo-register. The first argument is the pseudo-register number; the second argument is the pseudo-register name; and the third argument is a number that identifies an rvalue-event.

A function herein termed "prp$preg_store()" traces loads of a pseudo-register. The first argument is the pseudo-register number; the second argument is the pseudo-register name; and the third argument is a number that identifies an rvalue-event.

Regarding prp$xsym$(), the first argument is the symbol name of the event (refer not to common/equivalence blocks but to their members instead). The other arguments are a symbol-identifying number, a storage class, an export class and flags.

Every mod/ref trace item, except for pseudo-registers, provides the size and address of the object accessed. This is essential information for the later merge phase. For pseudo-registers, the rvalue kind implicitly incorporates the size of the object.

The instrumented executable 360 for producing the value trace 390 does not trace stack-allocated objects during recursive calls to the program unit containing the marked region. The executable 360 traces stack-allocated object references for only the top-level active marked region. Outside the active marked region instance and in recursive calls to the already active region, the instrumentation traces only reference parameter (i.e., indirect) static, common and global object references.

The run-time library ("libpurple_runtime.so") handles this by increasing an entry counter (described above) every time a region-entry event occurs when tracing is already active. When the counter is larger than 1, this instance of the active region is nested, and the instrumentation ignores the tracing of values pertaining to stack-allocated objects.

Modification/reference (herein, "mod/ref") instrumentation inserts calls to the run-time library ("libpurple_runtime.so") to trace loads and stores of data objects in the original program. There are two different modes of mod/ref instrumentation. Within the marked region, the instrumentation traces references to parameters, local variables, temporaries (including pseudo-registers), saved variables, static variables, common blocks and external variables. Outside the marked region and within functions and sub-programs that the marked region calls directly or indirectly, the instrumentation traces references to all of the above except stack-allocated objects (i.e., saved and static variables, common blocks, external variables, and indirectly accessed objects (including reference parameters, where a determination of what kind of object the program is accessing is not possible)).

Tracing a Mod/Ref Event

In one embodiment, for each load or store operation in the intermediate representation language ("IRL") generated by the front end of the compiler, the invention suite inserts one or two function calls into the code: one call for the mod/ref event and separate calls as necessary to record the associated rvalue and symbolic reference ("xsym") events. Not all indirect load or store events may have a symbolic reference event since the symbol may be unknown. Rvalue events are used only for pseudo-registers, which have no address to pass to trace-event library functions.

The rvalue and symbolic reference events occur before and temporally close to the corresponding mod/ref event. No other symbolic reference events or mod/ref events intervene between a given symbolic reference event and its corresponding mod/ref event.

In one embodiment, the run-time library ("libpurple_runtime.so") buffers 256 rvalues. Accordingly, up to 255 rvalue events and any number of other events may intervene between an rvalue event and its corresponding mod/ref event. The instrumenter emits all rvalues pertaining to a particular IRL statement together and before the corresponding mod/ref events. The 256-rvalue buffer overflows only if the statement requires more than 255 rvalue events. This scenario is empirically implausible.

As an example, consider the following intermediate representation for FORTRAN code, IRL Example No. 1. Pseudo-register "preg0," arrays "a," "b," and "c," and index variables "i" and "j" all denote values to be traced:

i=preg
preg0=f2()
j=preg0
a(i,j)=b(i−1,j)+c(i,j−1)
IRL Example No. 1

The instrumentation takes the following form, as expressed using FORTRAN call-by-value parameter passing ("% val")

```
CALL prp$i4rvalue$(%val(6), %val(preg))
CALL prp$preg_load$(%val(73), 'preg'.% val(6))
i = preg
CALL prp$xsym$('i', %val(16777221), %val(1), %val(0),\
    $val(88)
CALL prp$xsym_store$(i, %val(0_8), %val(8))
preg0 = f2( )
CALL prp$i4rvalue$(% val(7), %val(preg0))
CALL prp$preg_store$(%val(74), 'preg0', %val(7))
CALL prp$i4rvalue$(% val(9), %val(preg0))
CALL prp$preg_load$(%val(74), 'preg0', %val(9))
j = preg0
CALL prp$xsym$('j', %val(16777222), %val(1), %val(0),
    %val(8))
CALL prp$xsym_store$(j, %val(0_8), %val(8))
CALL prp$xsym$('b', %val(16777218), %val(4), %val(0),\
    %val(0))
CALL prp$xsym_load$(b(i+ −1, j), %val(0_8), %val(16))
CALL prp$xsym$('j', %val(16777222), %val(1), %val(0),\
    %val(8))
CALL prp$xsym_load$(1, %val(0_8), %val(8))
CALL prp$xsym$('i', %val(16777221), %val(1), %val(0),\
    %val(8))
CALL prp$xsym_load$(i, %val(0_8), %val(8))
CALL prp$xsym$('c', %val(16777219), %val(4), %val(0),\
    %val(0))
CALL prp$xsym_load$(c(i, j + −1), %val(0_8), %val(16))
a(i, j) = (b(i + −1, j) + C(i, j + −1))
CALL prp$xsym$('a', %val(1677722), %val(1), %val(0),\
    %val(8))
CALL prp$xsym_store$(a(i, j), %val(0_8), %val(16))
```

IRL Example No. 2

IRL Example No. 2 shows the tracing of references to pseudo-registers and values of variables.

Preferably, some code intelligence removes redundant trace events from the instrumented code. For example, while there are 3 references to "i" in the statement, the instrumentation traces only one reference. The instrumentation compilation removes some events, and the library further removes redundant trace events at run-time. The objective is to reduce the number of the trace events written to file and to minimize run-time overheads for instrumented code.

In addition, the instrumentation would eliminate xsym events for "a," "b" and "c" if they were reference parameters outside of the scope of the marked region.

The events that the instrumentation of IRL Example No. 2 writes to the trace file 390 is as follows:

```
#PRP:XSTORE i < 16777221, 1, 0, 8><0x7fff1264> 14(5)
#PRP:ENTER_PU f2<23,12,4.0> "tmp.flist"
#PRP:EXIT_PU
#PRP_PSTORE 74 "preg0"=14(5)
#PRP:XSTORE j<16777222, 1, 0, 8> <0x7fff1260> 14(5)
#PRP:XLOAD b<16777218, 4, 0, 0>
    <0x7fffle38>F8 (6f6f7365, 2f746172)
#PRP:XLOAD c<16777219, 4, 0, 0> <0x7fff26c0> F8(0, 0)
#PRP:XSTORE a<16777220, 1, 0, 8> <0x7fff14a8>
    F8 (6f6f7365, 2f746172)
```

Trace-File Example No. 1
(Here the stores of 'preg', 'i' and 'j' before the loads cause the run-time library to eliminate the loads from the trace.)

Tracing Values Passed by Reference

Currently, no means exists for determining the parts of an object, passed by reference to a library function or to an IO statement, accessed as a result of the call. In one embodiment, when the value passed by reference is not an array or an array element, the invention suite takes a conservative approach and assumes the whole value denoted by the reference parameter is both read and written.

For array and array-element reference parameters, the size may be unknown (e.g. for assumed sized or adjustable sized arrays) or large, substantially complicating the conservative approach. In this case, the invention suite instead ignores them and issues a warning to the user.

In one embodiment, the invention suite asks the user whether the memory area is referenced and/or modified. This information is then taken into account.

For calls to instrumented functions and subroutines, the invention suite traces reference parameters as indirect loads and on the callee side and accurately determines all mod/ref events.

For intrinsic functions, other than I/O statements, compiler knowledge of the exact semantics guides the traces of reference parameters.

Return Registers and Return Variables

Implementing the instrumentation at a low (e.g., compiler intermediate language) level rather than a higher (e.g., source-code) level generates a point of complexity regarding return registers and returns variables. Since the instrumenter does not emit return register references in the intermediate source files 360, the invention suite does not trace loads and stores of pseudo-registers denoting function-call return registers. Nor does the invention suite trace references to the local (automatic) variable the compiler front-end creates to represent a function return-value.

Concerning the insertion of instrumentation code around references to return registers, notably, the instrumentation code takes the form of subroutine calls to utilities in the run-time library. These utilities may again call other functions and therefore change the values in return registers. The instrumenter takes advantage of some assumptions about the code from the compiler front-end to handle this issue:

A function call, followed by a use of the return value, is represented by code sequences to invoke the call immediately followed by a sequence of stores of the return registers into temporary variables.

The code sequence for a function return statement is immediately preceded by stores of the return value into return registers.

These patterns of code avoid instrumentation between a call and the subsequent saves of the return registers and between a return and the preceding stores into return registers. An approximation of the intermediate representation code for a call to a library subroutine "afun" is given in the IRL Example No. 3 following:

CALL afun(<parameters>)
<lhs1>=return_reg1
<lhs2>=return_reg2
<other_statements>

IRL Example No. 3

A trace of stores to the <parameters> requires instrumentation after the call. The instrumenter sinks the instrumentation down to immediately before <other_statements>. Even when <lhs1> (or <lhs2>) is referenced in <parameters>, this sinking process works, since the instrumentation for the explicit assignments to <lhs1> and <lhs2> is placed immediately after the instrumentation for stores to <parameters>.

An approximation of the intermediate representation code for a return site follows in IRL Example No. 4:

return_reg1=<rhs1>
return_reg2=<rhs2>
RETURN

IRL Example No. 4

A function-exit event is not inserted immediately before the RETURN statement, but instead floats up until just before the assignment of <rhs1>. Similarly, any trace of the references in <rhs1> and <rhs2> also float up to just before the assignment of <rhs1>.

Tracing Variable Definitions

At the beginning of each function body and at the beginning of the body of the marked region of interest, the instrumenter inserts instrumentation to denote variable definitions. This instrumentation takes the form of two calls to subroutines in the run-time library: herein termed "prp$xsym$()" (described above) and "prp$variable_definition$()."

Prp$variable definitions$() takes two arguments, the variable address and its size (if known). Since variable addresses are unknown (unresolved) until run-time, the emission of this information is delayed from compile-time to run-time. In the trace file, such variable definitions are emitted i n the form of VDEF entries.

Within the marked region, the in strumented program produces VDEF's for all variable definitions visible within the scope of the region. The VDEF instrumentation for the region treats reference parameters like the addresses of local variables.

Outside the marked region of interest, during its execution, the instrumented program inserts VDEF entries into the trace, only for variables visible in the scopes of the program units on the dynamic call graph. This instrumentation traces only definitions for static and saved, common/equivalence and external variables. This allows the creation of a data structure to represent the program defined memory space.

By further tracing dynamic memory allocation and deallocation events, the invention can calculate the dynamic memory space as part of the program defined space, and the deallocated dynamic memory space as a part of the memory space of no concern.

Adjustable Array Bounds

Adjustable array bounds generate a call to the prp$i4rvalue$() function to trace the actual value. They are inserted between calls to the trace events prp$arbnd_begin$() and prp$arbnd_end$() in order to recognize them as array bounds by the run-time library. Each adjustable array bound thus has a unique numeric identifier, i.e., the rvalue identifier. In the trace file, such array bounds are emitted as ARBND entries. This is further described below.

Value Tracing

The developer executes the instrumented executable 360 producing the value trace 390. Example command lines for the above compilation and this execution are shown in Command-Line Example No. 2 following:

$ f77 file1.f file2.f -PURPLE:=on:lang_f77: trace_values/-lpurple_runtime -o values_trace_instrumented $ $ values_trace_instrumented<input>output Command-Line Example No. 2

Compiling to Produce Intermediate Source Files

The developer compiles the source files 310 to produce intermediate source files 370. These intermediate sources 370 are close to the final extracted sources 320 but have placeholders where values or code depending on such values is missing.

The marked region is emitted as a subroutine (herein named "prp_region()") and is declared with the same parameter profile (i.e., the same argument and return types) as the subroutine which originally enclosed the region. The body of prp_region() consists of only the statements within the marked region. Placeholders enclose prp_region() for initialization and final checking.

If the program unit that encloses the region is called recursively during execution of the region (as the dynamic call graph determines), then this compilation also defines this program unit in its original form with its original name.

The "main" program calls prp_region() and defines a local variable for each reference parameter of prp_region(). Again, placeholders for initialization and final checking of reference parameter values are inserted before and after the call.

Other program units that do not contain the marked region but are on the dynamic call graph have placeholders for initialization at the beginning of their statement lists.

In one embodiment, the placeholders are as follows, where the first five tokens after a PRP_XSYM placeholder are the xsym attributes of name, id, sclass (storage class), eclass (export class), and flags:

<#PRP_XSYM:DECLARE_INITIALIZERS f2, 23, 12, 4, 0 #> marks the place of insertion for declarations related to initializers for function 'f2.'

<#PRP_XSYM:CODE_INITIALIZERS f2, 23, 12, 4, 0 #> marks the place of insertion for code to do initialization for function 'f2.'

<#PRP_XSYM:TEST_VARIABLES prp_region, 4294967295, 12, 1, 0 #> marks the place of insertions for code to test final values of all variables visible in the context of the region, except parameters.

<#PRP_XSYM:INITIALIZE_PARAMETERS prp_region, 4294967295, 12, 1, 0 #> marks the place of insertion for code to initialize region parameters.

<#PRP_XSYM:TEST_PARAMETERS prp_region, 4294967295, 12, 1, 0#> marks the place of insertion for code to test final values of region parameters.

<#PRP__XSYM__ASSUMED d, 16777220, 4, 0, 0, 5<17_8, [#4], 17_8, [#5]>, 4#> marks the bounds of an assumed sized array, where the dimension value need to be inserted as a constant. The notation "[#4]" denotes an adjustable array bound to be replaced by a value in the same manner as an ARBND placeholder. This particular example denotes an array with dimensions "(17, m, 17, n, *)", where 'm', 'n', and '*' must be substituted by constant values. The '5' preceding the array bounds ('<>') indicate the number of dimensions. The '4' after the dimensions denote the element size. This placeholder is also used for variable sized character strings.

<#PRP__UNIT:ARBND 1#> marks an adjustable array bound, to be replaced by the value denoted by the ARBND trace item with identifier '1.'

The merge process replace the placeholders with correct compilable code.

In one embodiment, the compilation for value-tracing instrumentation (e.g., with the "-PURPLE:trace__values" option) not only instruments the compiled program to emit a value trace (as described above), but the compilation itself also emits the intermediate extracted sources 370.

Merging Intermediate Sources With a Value Trace for Extracted Sources

At this point, the invention suite has created three files: the extracted intermediate source files 370, the call-graph file 350 and the value-trace file 390. The last step of the source extraction process is represented by the Command-Line Example No. 3:

$ merge -lang__ftn file1.f file2.f . . . file3.f

Command-Line Example No. 3

The merge program read s the intermediate source files 370 corresponding to the original source files 310, reads the values-trace file 390 and produces the extracted sources 320, step 260.

The output from the merge includes one extracted source file 320α per corresponding original source file 310α (but not counting include files (".h files")). The extracted file 320α has the same name as the original source file but has a modified suffix (".prp.f") instead of the original ".f" suffix.

Empty output files may optionally be removed.

The extracted source files 320 may be compiled to produce an extracted executable that replays the region of interest exactly as it was executed in the original program 310.

The merge phase reads in the value trace 390, builds up a data structure to represent the program address space (including variable definitions, initial values, and final values) and pipes each intermediate source file through a pattern matcher out to a corresponding extracted source file. The merge process replaces any placeholders in the intermediate sources 370 with compilable code.

The Value Space

The merge process builds up a representation of the total memory space of the original program 310 in terms of initial and final values for each address. The value trace 390 provides these values in terms of load and store events ordered in time. The initial value for an address corresponds to the first load from that address without a preceding load into that address. (If a store precedes the first load, the initial value is undetermined and unused.) The final value for an address corresponds to the last store into that address.

The value trace 390 includes trace items denoting direct loads and stores of symbols. Such trace items are used to initialize and test the final values of the given symbols.

Other trace items may denote indirect loads and stores through pointers (or reference parameters) with no indication of what is referenced. To handle such values efficiently, the merge process keeps the initial values of the address space in a single data structure permitting fast look-up, insertion and modification of values. A bit pattern at an address range represents each value. Red-black interval trees, sorted on base address values, enable the insertion or merge of 'n' values into the data structure in O(n*log(n)) time. (Regarding red-black interval trees, see Cormen et al., *Introduction to Algorithms* (McGraw Hill, 1990), pp 290–296. Cormen et al. is incorporated herein by reference.)

To reduce the size of the interval tree, the process makes some effort to merge adjacent values into larger values. However, the process can safely do so only for values known to refer to the same variable (xsym). Values that overlap in any way are merged into one. This prevents merging values adjacent in the address space but denoting distinct declared variables.

The Defined Memory Space

While reading the values (via trace loads and stores) and building up the value space, the merge process also reads variable definitions from the trace file 390. Based on these variable definitions, the merge process builds up a second data structure, a red-black interval tree of address space segments. Each address space segment denotes an ordered set of variable definitions that overlap each other in some manner. The variable definitions are ordered on base addresses within each segment. (Address space overlaps occur as a result of aliasing, typically because of equivalences.)

After the merge process has read in the complete value trace 390, built up the value space and created the defined memory space, it traverses the two red-black interval trees and inserts initial and final values under the appropriate variable definition. The order of events is important. The process inserts values under variable definitions that it encountered before the values themselves (such that the associated variable can be initialized before the first reference to the value).

After this step, the merge process has associated values with variables and has resolved overlapping variables into segments. With the information available regarding the range of addresses represented by each segment and the address range between segments, the merge process now assigns sizes to variables of unknown size (such as assumed sized arrays in FORTRAN).

The Memory Map

In order to insert initializers in various program unit contexts and to insert final tests in the context of the purple region, the merge process organizes the defined memory space into a hierarchy of files, program units and variable definitions. Once this hierarchical memory map reflects the program-text structure, the merge process deletes the defined memory space and replaces placeholders with values, initialization code and final testing code.

Note that pseudo-red loads and stores determine initial and final values for pseudo-regs, and are used to initialize and test final values for pseudo-registers in the extracted source for the region (i.e., in the prp__region subroutine). There is no need to initialize pseudo-registers outside the region. (As with the other pseudo-register issues described above, this one as well is an artifact of a low level implementation.)

Replacing Placeholders

Having read the trace items (collectively, 390), the merge reads the intermediate sources 370 and pipes the input out to the final extracted source files 320. The merge will every so often encounter a placeholder pattern and temporarily suspends the piping process to substitute source code for the placeholder.

In one embodiment, the merge process recognizes the placeholder patterns described above.

Most importantly, the merge process inserts initializers for data objects and pseudo-regs so that the program state matches that of the original program prior to its executing th e statements of the marked-and-now-extracted region. The memory map built as described enables this. Upon encountering a DECLARE_INITIALIZER placeholder and a CODE_INITIALIZERS placeholder, which may be separated by some initialization code (to deal with adjustable local arrays, for example), the merge process inserts the initializer and associated declarations into the extracted source file 320α and then continues to stream the intermediate source file 370α through to the extracted source file 320α. Upon encountering a TEST_VARIABLES placeholder, the merge process emits final values tests. The placeholder uniquely identifies a program unit, and the corresponding part of the memory map determines what needs to be initialized and what values need to be tested.

Similarly, upon encountering INITIALIZE_PARAMETERS, the process emits initializers for all parameter variables under the denoded program unit memory map. Upon encountering a TEST_PARAMETERS placeholder, the process emits final values tests for all variables under the denoded program unit memory map.

Note that the merge process searches the program memory map for the appropriate program unit memory map based on the xsym (program unit symbol identifier) given by the placeholder. In one embodiment, the merger sorts the lists of file and program unit memory maps to allow this search to take place in O(n*log(n)) time, where n is the greater of the number of files and the number of program units per file.

Scenario Revisited

Consider again the scenario of Program-Text Example No. 1 above. With value-trace instrumentation as described above, an example of the corresponding intermediate sources 370 follows:

```
INTEGER*4 FUNCTION f(a, b, n)
IMPLICIT NONE
REAL*8 a(n, 2_8, *)
REAL*8 b(n)
INTEGER*4 n
INTEGER*4 i
REAL*8 deref_c0(n)
POINTER(c0, deref_c0)
INTEGER*4 preg
<#PRP_XSYM:DECLARE_INITIALIZERS f, 22, 12, 4, 0 #>
c0 = ALLOCA((n * 8))
<#PRP_XSYM:CODE_INITIALIZERS f, 22, 12, 4, 0 #>
preg = n
DO i = 2, preg, 1
    deref_c0(i) = b(i)
    a(i, 1, 2) = (deref_c0(i) + a(i + -1, 1, 2))
    a(i, 1, 4) = (deref_c0(i) + a(i + -1, 1, 4))
END DO
f = i
RETURN
END! f
INTEGER*4 FUNCTION prp_region(a, b, n)
IMPLICIT NONE
REAL*8 a(n, 2_8, *)
REAL*8 b(n)
INTEGER*4 n
INTEGER*4 f
INTEGER*4 preg
    <#PRP_XSYM:DECLARE_INITIALIZERS prp_region,
1 4294967295, 12, 1, 0 #>
    <#PRP_XSYM:CODE_INITIALIZERS prp_region,
1 4294967295, 12, 1, 0 #>
    preg = f(a, b, n)
    prp_region = preg
    <#PRP_XSYM:TEST_VARIABLES prp_region,
1 4294967295.12, 1. 0 #>
    END! prp_region
PROGRAM MAIN
IMPLICIT NONE
REAL*8 A(<#PRP_XSYM:ASSUMED a 16777218, 4, 0, 0, 3
1 <[#1], 2_8>, 8#>)
    INTEGER#4 n
    EXTERNAL prp_region
    INTEGER*4 prp_region
    INTEGER*4 prp_return
    <#PRP_XSYM:INITIALIZE_PARAMETERS prp_region,
1 4294967295, 12, 1, 0 #>
C
C    ****Call to extracted purple region****
C
    prp_return = prp_region(a, b, n)
    <PRP_XSYM:TEST_PARAMETERS prp_region,
    4294967295,
1 12, 1, 0 #>
    END! MAIN
```

Program-Text Example No. 7

The merge process reads in the above intermediate source 370 and the value trace 390 and replaces all placeholders in the files 370. The result is the following extracted program 320:

```
INTEGER*4 FUNCTION f(a, b, n)
IMPLICIT NONE
REAL*8 a(n, 2_8,*)
REAL*8 b(n)
INTEGER*4 n
INTEGER*4 i
REAL*8 deref_c0(n)
POINTER(c0, deref_c0)
INTEGER*4 preg
c0 = ALLOC((n * 8))
preg = n
DO i = 2, preg, 1
    deref_c0(i) = b(i)
    a(i, 1, 2) = (deref_c0(i) + -1, 1, 2))
    a(i, 1, 4) = (deref_c0(i) + -1, 1, 4))
END DO
f = i
RETURN
END ! f
INTEGER*4 FUNCTION prp_region(a, b, n)
IMPLICIT NONE
REAL*8 A(N, 2_8, *)
REAL*8 b(n)
INTEGER*4 n
INTEGER*4 f
INTEGER*4 preg
C    ****Purple Declarations****
C
    INTEGER*8 prp_loc
    COMMON /prp_loc/ prp_loc(16)
    preg = f(a, b, n)
    prp ___region = preg
C    ****Purple Final Testing****
C
    prp_loc(1) = %loc(prp_region)
    CALL prp_final_test0(prp_loc(1))
    END ! prp_region
PROGRAM MAIN
IMPLICIT NONE
REAL*8 a(4,2,4)
REAL*8 b(4)
INTEGER*4 n
EXTERNAL prp_region
```

-continued

```
      INTEGER*4 prp_region
      INTEGER*4 prp_return
C     ****Purple Declarations****
C
      INTEGER*8 prp_loc
      COMMON /prp_loc/ prp_(16)
      LOGICAL prp_inited
      SAVE prp_inited
      DATA prp_inited /.FALSE./
C     ****Initialization****
C
      IF (.NOT. prp_inited) THEN
          prp_inited = .TRUE.
          prp_loc(1) = %loc(n)
          prp_loc(2) = %loc(a)
          prp_loc(4) = %loc(b)
          CALL prp_init0(prp_loc(1), prp_loc(2) + 64,
     1 prp_loc(2) + 192, prp_loc(4) + 8)
          END IF
C
C     ****Call to extracted purple region****
C
      prp_return = prp_region(a, b, n)
C     ****Purple Final Testing****
C
      prp_loc(1) = %loc(a)
      CALL prp_final_testl(prp_loc(1) + 72, prp_loc(1) +
     1 200)
      END! MAIN
```

Program-Text Example No. 8

Of course, the program text for such software as is herein disclosed can exist in its static form on a magnetic, optical or other disk, on magnetic tape or other medium requiring media movement for storage and/or retrieval, in ROM, in RAM or other integrated circuit, or in another data storage medium. That data storage medium may be integral to or insertable into a computer system.

In one embodiment, all the components are implemented in the C++ programming language, except for the runtime library which is implemented in the C programming language.

The embodiments described herein are by way of example and not limitation. Modifications to the invention as described will be readily apparent to one of ordinary skill in the art. For example, the applicability of the invention to source code languages other than FORTRAN (e.g., C) is manifest.

As another example, a routineer in the art will understand that given all necessary inputs at the initial command line, the suite of programs can perform all compilations and executions without further human intervention, essentially in "batch mode."

What is claimed is:

1. A method for extracting a program region from an original source for execution external from the original source, said method comprising:

marking said program region in said original source;

generating a values-trace file corresponding to said program region;

generating an intermediate source corresponding to said original source; and producing, from said original source, an extracted source to execute, external to said original source, substantially only said program region as it executes in said original source, including merging said intermediate source and said values-trace file.

2. The method of claim 1 wherein said step of marking comprises conditionally marking said program region in said original source.

3. The method of claim 1 wherein said step of generating a values-trace file comprises:

instrumenting said original source to produce a values trace.

4. The method of claim 3 wherein before said step of instrumenting the following steps occur instrumenting said original source to produce a call graph corresponding to an execution of said program region; and said step of instrumenting to produce a values trace comprises reading said call graph.

5. The method of claim 1 wherein said step of generating an intermediate source file comprises:

compiling said original source, emitting a placeholder where a value is missing.

6. The method of claim 5 wherein said step of merging comprises:

replacing placeholders in said intermediate source with values from said trace file.

7. The method of claim 1 wherein said step of generating an intermediate source file comprises:

compiling said original source, emitting a placeholder where code depending on an unknown value is missing.

8. The method of claim 7 wherein said step of merging comprises:

replacing a placeholder in said intermediate source with a value from said trace file.

9. A method for extracting a program region from an original source, said method comprising:

marking said program region in said original source;

generating a values-trace file corresponding to said program region;

generating an intermediate source corresponding to said original source;

merging said intermediate source and said values-trace file; and producing an extracted source to execute substantially only said program region as it executes in said original source.

10. The method of claim 9, wherein said step of generating a values-trace file comprises instrumenting said original source to produce a values trace, and wherein before said step of instrumenting the following steps occur:

instrumenting said original source to produce a call graph corresponding to an execution of said program region; and said step of instrumenting to produce a values trace comprises reading said call graph.

11. The method of claim 9 wherein said step of generating an intermediate source file comprises compiling said original source, emitting a placeholder where a value is missing.

12. The method of claim 11 wherein said step of merging comprises replacing placeholders in said intermediate source with values from said trace file.

13. The method of claim 9, wherein said step of generating an intermediate source file comprises compiling said original source, emitting a placeholder where code depending on an unknown value is missing.

14. The method of claim 13 wherein said step of merging comprises replacing a placeholder in said intermediate source with a value from said trace file.

* * * * *